(12) United States Patent
Lu (10) Patent No.: US 8,109,640 B2
(45) Date of Patent: Feb. 7, 2012

(54) OPTICAL ENGINE COMPRISING A CHASSIS WITH A COLOR WHEEL MODULE ELECTRICALLY CONNECTED TO THE CHASSIS

(75) Inventor: Chang-Hsing Lu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 928 days.

(21) Appl. No.: 11/748,706

(22) Filed: May 15, 2007

(65) Prior Publication Data

US 2008/0079909 A1 Apr. 3, 2008

(30) Foreign Application Priority Data

Oct. 3, 2006 (TW) ................................ 95136722 A (51) Int. Cl.
*G03B 21/14* (2006.01)
*G02B 7/00* (2006.01)

(52) U.S. Cl. .......................................... 353/84; 359/892
(58) Field of Classification Search ................ 353/84, 353/31, 97, 119, 122, 100, 101; 348/268, 348/270, 32–34, 41, 742, 743, 836; 250/239, 250/226, 216; 362/282, 322, 350, 538, 268, 362/365, 277; 359/227, 209.1, 226.2, 197.1, 359/619, 640, 891, 896, 892
See application file for complete search history.

(56) References Cited

U.S. PATENT DOCUMENTS

| | | | | |
|---|---|---|---|---|
| 6,971,752 B2 * | 12/2005 | Lee | .................................. | 353/84 |
| 6,994,439 B2 * | 2/2006 | Basey | ........................... | 353/119 |
| 7,044,749 B2 * | 5/2006 | Rogers et al. | ................... | 439/74 |
| 7,559,657 B2 * | 7/2009 | Arboix | ............................. | 353/61 |
| 7,837,336 B2 * | 11/2010 | Hsu et al. | ........................ | 353/84 |
| 2007/0008506 A1 * | 1/2007 | Meng et al. | ................... | 353/119 |

* cited by examiner

*Primary Examiner* — Que T Le
*Assistant Examiner* — Jennifer Bennett
(74) *Attorney, Agent, or Firm* — Patterson Thuente Christensen Pedersen, P.A.

(57) ABSTRACT

A color wheel module for use in a projection apparatus is disclosed. The projection apparatus comprises an optical engine, which comprises a chassis and an electrical socket. The electrical socket is disposed on the chassis. The color wheel module comprises a color wheel, a housing module and a connecting device. The connecting device comprises a fastening device and an electrical connector. The color wheel and the electrical connector are disposed on the housing module, wherein the electric connector is adapted to electrically connect to, and detach from, the electrical socket when the housing module is fastened onto the chassis through the fastening device.

11 Claims, 7 Drawing Sheets

OPTICAL ENGINE COMPRISING A CHASSIS WITH A COLOR WHEEL MODULE ELECTRICALLY CONNECTED TO THE CHASSIS

This application claims priority to Taiwan Patent Application No. 095136722 filed on Oct. 3, 2006, the disclosures of which are incorporated herein by reference in their entirety.

CROSS-REFERENCES TO RELATED APPLICATIONS

Not applicable.

BACKGROUND OF THE INVENTION

1. Field of the Invention

The subject invention relates to a color wheel module. More specifically, the subject invention relates to a replaceable color wheel module for use in a projection apparatus.

2. Descriptions of the Related Art

Digital light processing (DLP) technology has been adopted in digital projection apparatuses to generate digital images. The technology has been developed mainly by utilizing micro electro mechanical systems (MEMS), such as digital micromirror devices (DMD), as a basis for cooperation with other peripheral optical devices. The traditional DLP projection apparatus comprises a light source, a color wheel module, a light tunnel, a lens assembly for light separation and combination, a DMD, and a projection lens.

Currently, DLP projection apparatuses integrate the light tunnel, the color wheel and the lens assembly for light separation and combination in an optical engine. The optical engine is divided into two regions, a light input region and an image output region. When the light is projected from the light source, it is separated into red, blue, and green colors via the color wheel and these three colors are sent into the light tunnel to uniform the intensity of light respectively. After light separation and combination via the lens assembly, the light enters into the DMD and the image input signals are received by the DMD so that the micromirrors thereon will rotate to project the correct light and images onto the projection lens. Finally, the images are displayed on a screen via the projection lens.

The popular applications for the present DLP projection apparatus are divided into two types; one is applied in conference settings, and the other is applied in home entertainment applications. The former emphasizes the brightness of images, so a color wheel is usually adopted for the design of four color segments (white, green, blue and red) to provide brighter light. On the other hand, the latter emphasizes certain characteristics of images of home video, such as color fidelity, saturation and contrast, so a color wheel is usually adopted for three color segments (green, blue and red).

Most DLP projection apparatuses in the current market adopt a design of a fixed color wheel module. The functions of each type of the DLP projection apparatuses mentioned above are unable to change so that users must buy those two different types of the DLP projection apparatuses to meet different requirements. Moreover, if the color wheel module fails and needs to be fixed, the only thing for users is to send the projector back to the dealer for maintenance rather than exchange a new component by themselves. Furthermore, for technicians, detaching the color wheel from a projector during repair and maintenance requires complicated procedures, resulting in overall inconvenience for both users and technicians.

Therefore, a design for a connection between the color wheel module and the optical engine that enhances the efficiency and performance of a DLP projection apparatus and at the same time allows users to detach and assemble a color wheel module quickly is desired.

SUMMARY OF THE INVENTION

An objective of the subject invention is to provide a color wheel module for use in a projection apparatus where a user or a technician can detach the color wheel module from a projection apparatus or assemble the color wheel module thereonto quickly for conductive connection. The projection apparatus comprises an optical engine, which comprises a chassis and an electrical socket which is disposed on the chassis. The color wheel module comprises a color wheel, a housing module, and a connecting device. The connecting device comprises a fastening device and an electrical connector. The color wheel and the electrical connector are disposed on the housing module so that they may be detached when needed, wherein the electrical connector is adapted to electrically connect to, and readily detach from, the electrical socket when the housing module is fastened onto the chassis through the fastening device.

The detailed technology and preferred embodiments implemented for the subject invention are described in the following paragraphs accompanying the appended figures for those skilled in this field to well appreciate the features of the claimed invention.

DESCRIPTION OF THE PREFERRED EMBODIMENT

Figure 1:
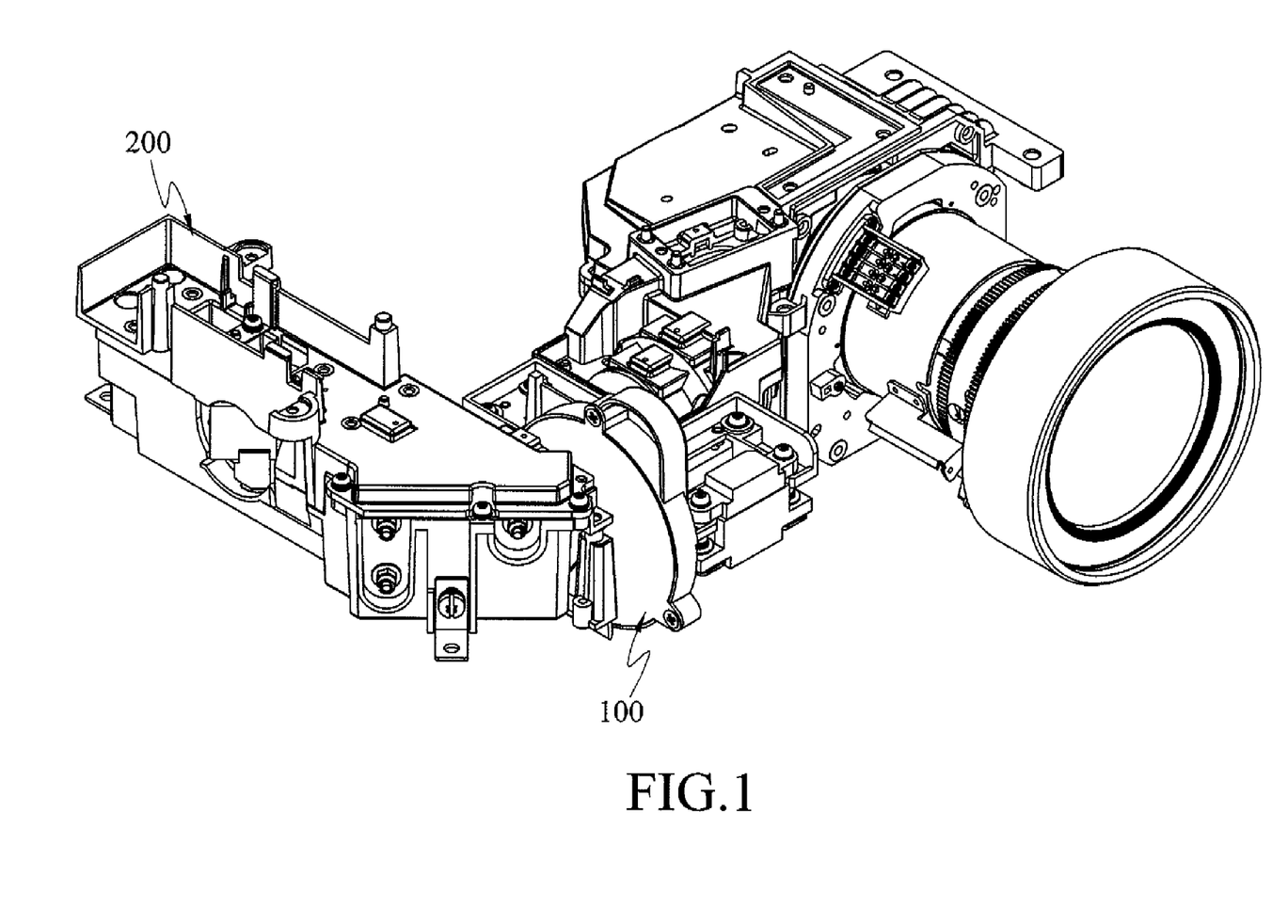
FIG. 1 depicts an assembly schematic drawing of a projection apparatus of the subject invention.

The characteristics of the subject invention emphasize the technology of fastening the color wheel module. Accordingly, the following disclosure only relates to the color wheel module and the peripheral components thereof in the projection apparatus, such as an optical engine. FIG. 1 illustrates a combination of a color wheel module 100 and an optical engine 200 of the projection apparatus. The other components that are not directly related to the color wheel module are neglected.

Figure 2:
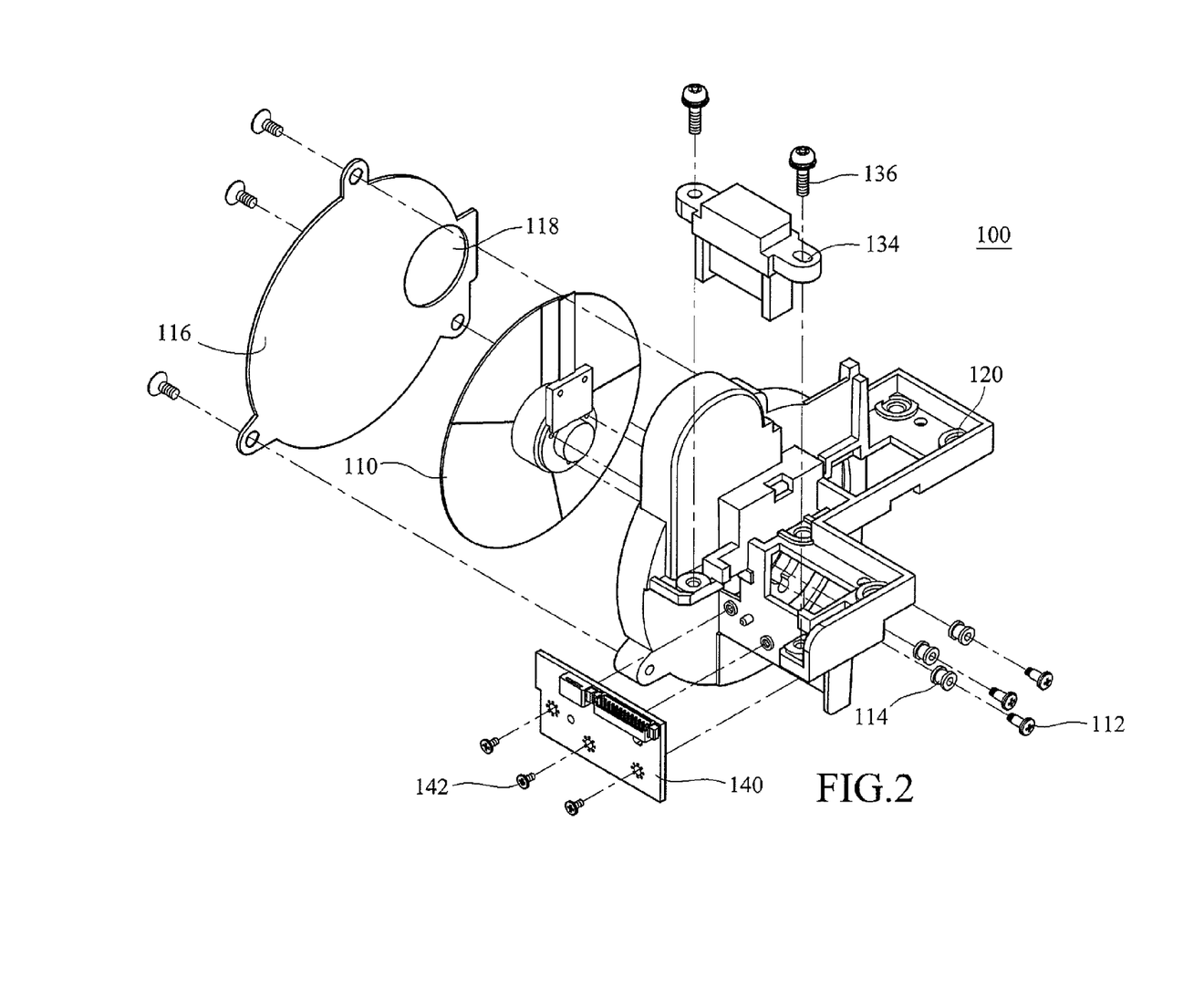
FIG. 2 depicts an exploded schematic drawing of an embodiment of a color wheel module of the subject invention.
Figure 7:
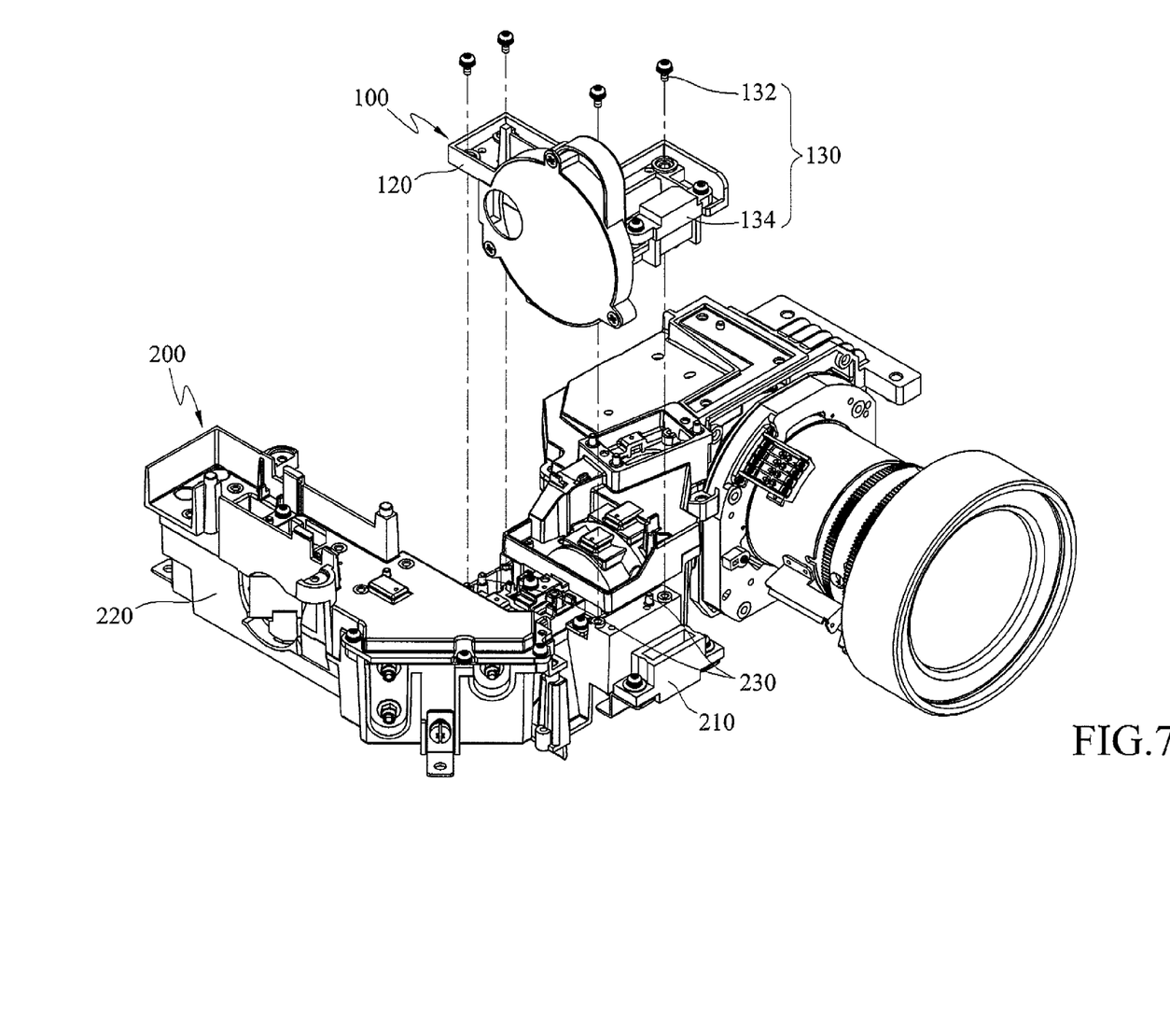
FIG. 7 depicts a schematic drawing of a color wheel module being detached from an optical engine.

FIG. 2 illustrates an exploded view of a color wheel module of an embodiment of the subject invention, wherein the color wheel module 100 primarily comprises a color wheel 110, a housing module 120 and a connecting device 130 (referring to FIG. 7 together). The connecting device 130 comprises a fastening device 132 (for example, a plurality of screws) and an electrical connector 134. The color wheel 110 and the electrical connector 134 are disposed on the housing module 120 so that they may be detached when needed.

Figure 3:
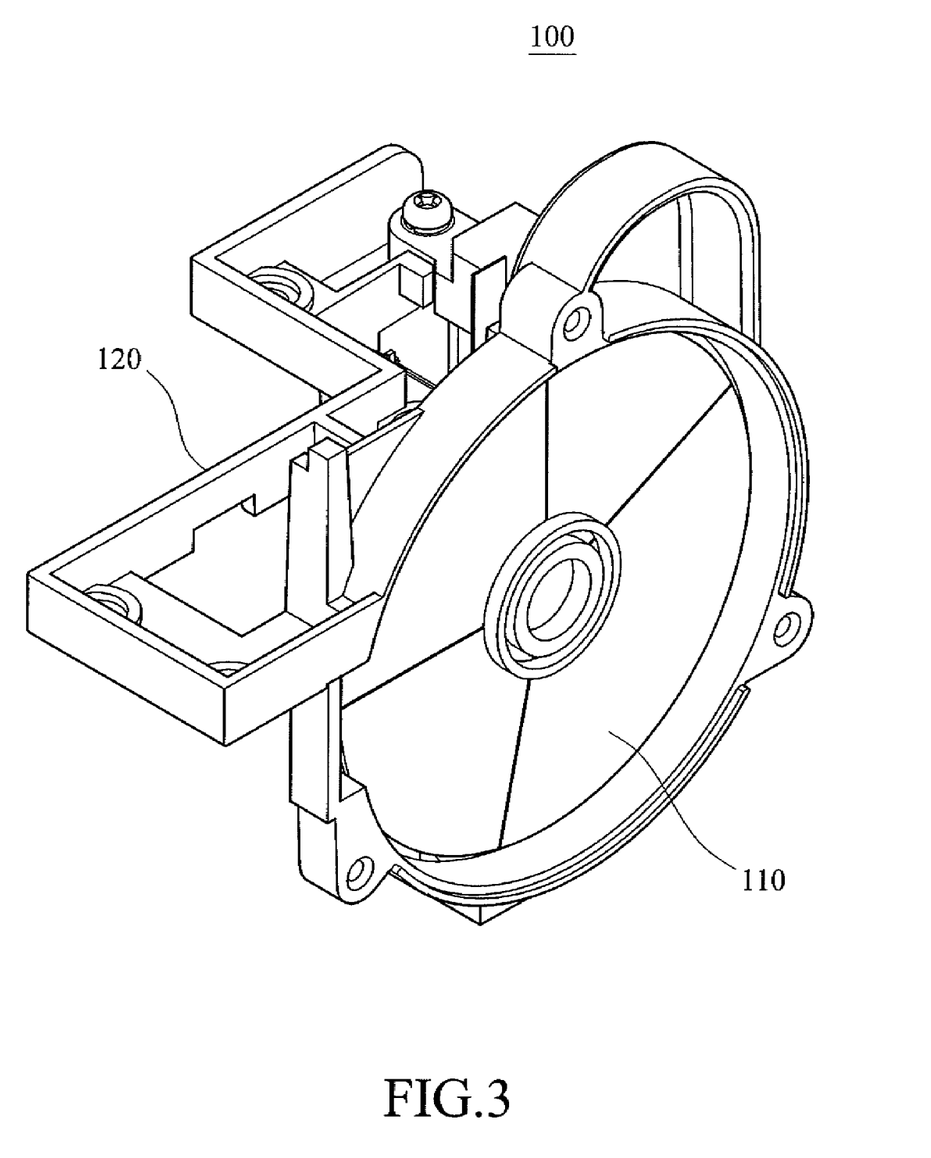
FIG. 3 depicts a partial schematic drawing of an embodiment of a color wheel module of the subject invention.

Referring to FIG. 3, the housing module 120 comprises a containing space for containing the color wheel 110, wherein a plurality of screws 112 and buffer 114 fasten the color wheel 110 inside the containing space onto the housing module 120. Next, a covering 116 is used to cover the color wheel 110 inside the containing space. Because the covering 116 has an opening 118, the light projected from the light source can enter into the containing space via the opening 118 so that it can be separated by the color wheel 110.

Figure 4:
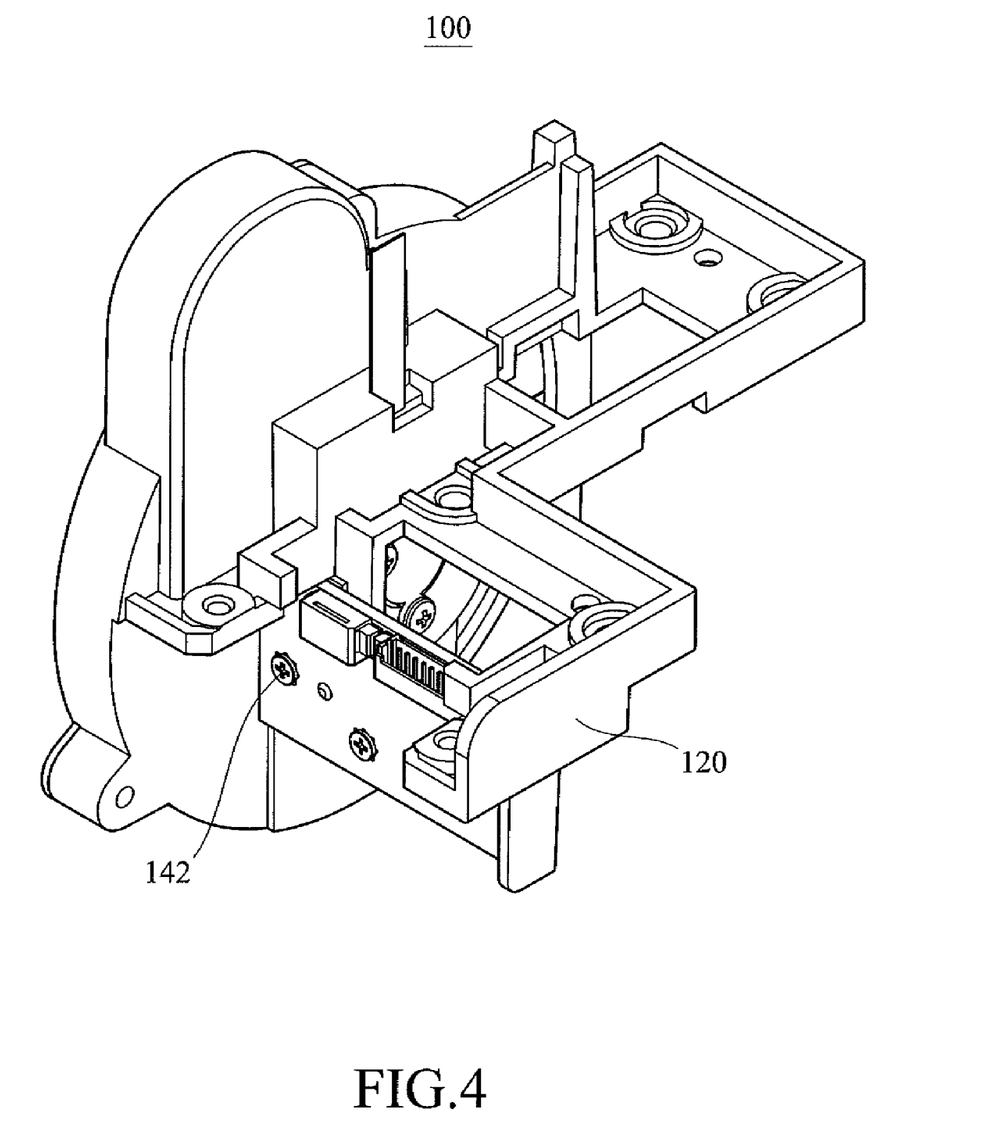
FIG. 4 depicts a schematic drawing of an index board assembling to a color wheel module.

Moreover, in the preferred embodiment, the color wheel module 100 further comprises an index board 140, disposed on the housing module 120, for identifying the color segments on the color wheel 110. Referring to FIG. 4, the index board 140 is fastened onto the housing module 120 via a plurality of screws 142. The index board 140 comprises two connecting ends, connecting to the color wheel 110 and the electrical connector 134 respectively. The electrical connector 134 electrically connects to the index board 140 so that the electrical connector is adapted to be used as an interface of power and signals transmission between the color wheel module 100 and the optical engine 200.

Figure 5:
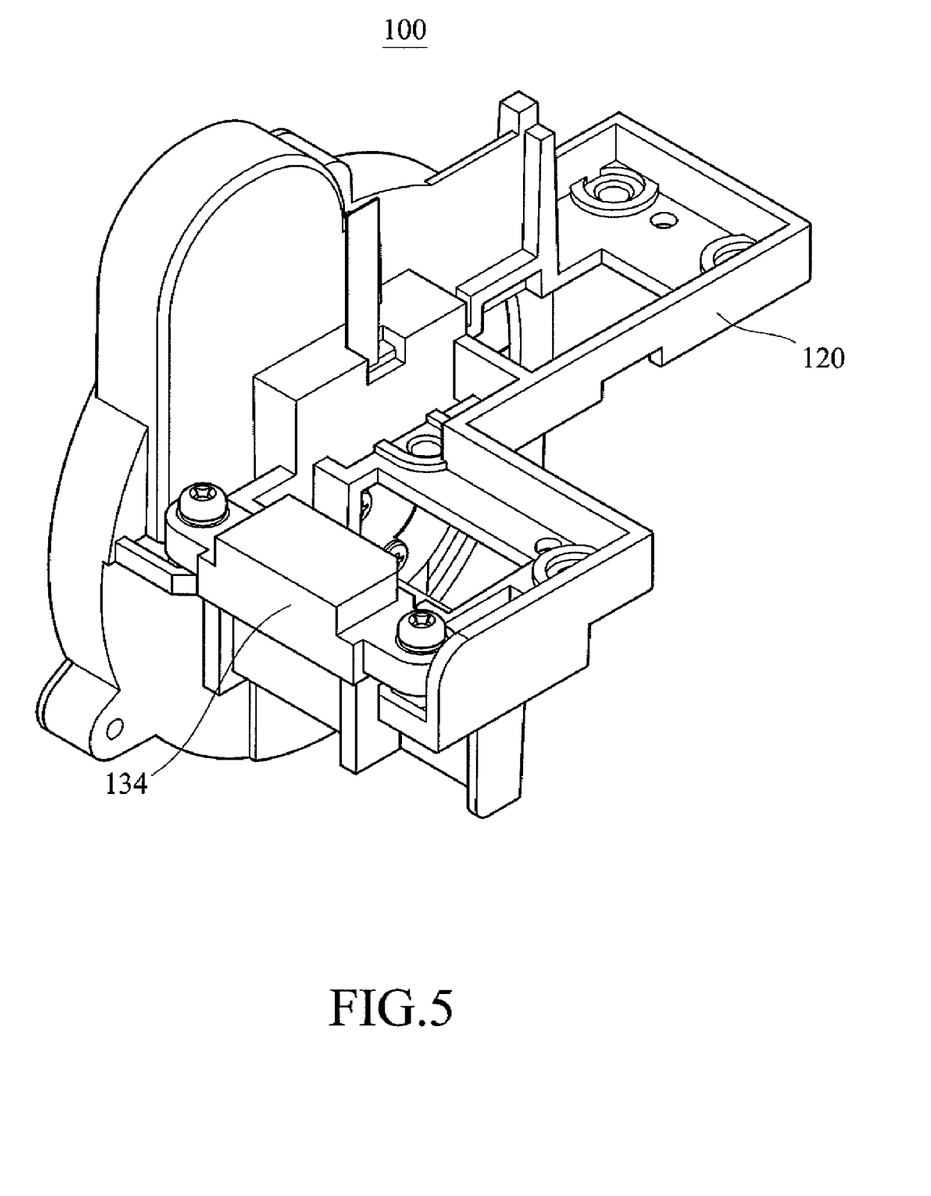
FIG. 5 depicts a schematic drawing of an electrical connector assembling to a color wheel module.
Figure 6:
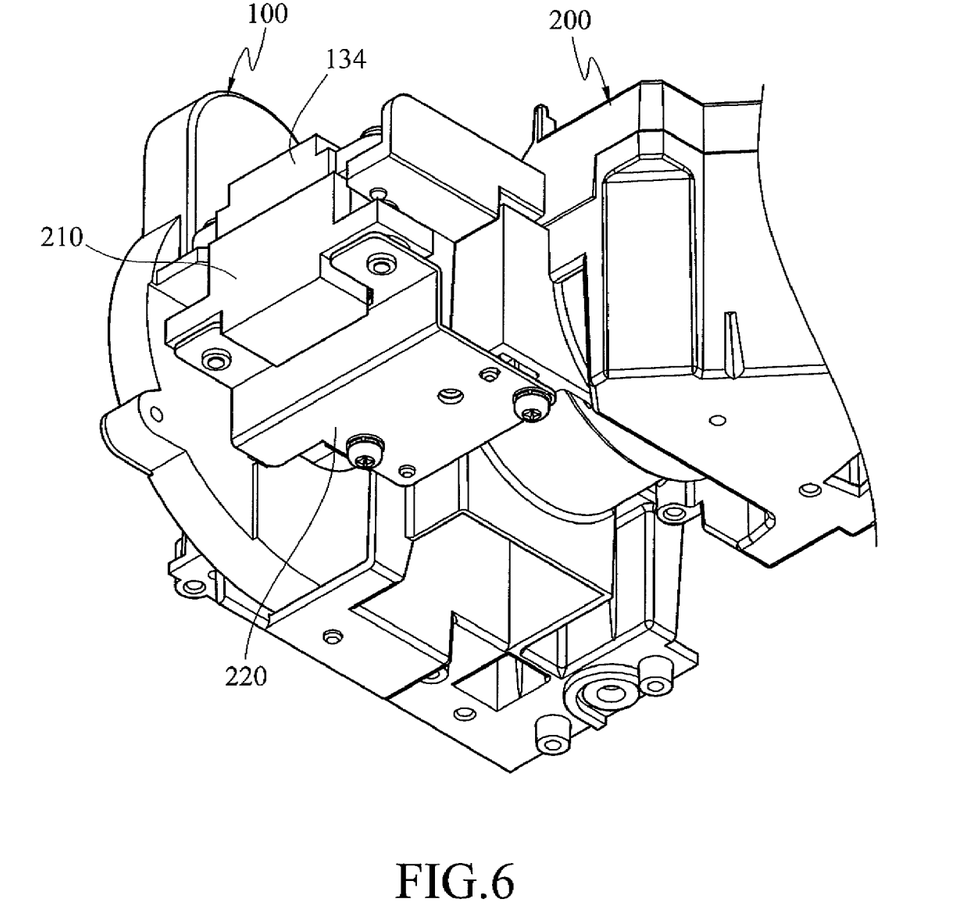
FIG. 6 depicts a schematic drawing of assembling an electrical connector of a color wheel module with an electrical socket of an optical engine.

Referring to the embodiments illustrated by FIG. 5 to FIG. 7, the electrical connector 134 is fastened onto the housing module 120 via a plurality of screws 136. The electrical connector 134 is a male connector. The optical engine 200 comprises an electrical socket 210, fixed on a chassis 220 thereof, whereas the electrical socket 210 is a female connector. When the color wheel module 100 is fastened on the optical engine 200, the position and the size of the electrical connector 134 on the color wheel module 100 is adapted to be plugged into the electrical socket 210 of the optical engine 200. Therefore, both power and signals transmission between the color wheel module 100 and the optical engine 200 can be conducted via the connection between the electrical connector 134 and the electrical socket 210. It is noted that the electrical connector 134 mentioned above can be a female connector as well, whereas the electrical socket 210 is a corresponding male connector. That is, the electrical connector 134 and the electrical socket 210 can be adapted to act as a transmission interface of power and signals between the color wheel module 100 and the optical engine 200 only after a connectable relationship is built up therebetween. The structures for the electrical connector 134 and the electrical socket 210 are preferably designed for quick plugging and instant use.

The color wheel module 100 of the subject invention further comprises a positioning device disposed thereon allowing the color wheel module 100 to be assembled onto the optical engine 200 or detached therefrom rapidly. The positioning device cooperates with a movement of the fastening device 132 so that the color wheel module 100 can be assembled onto the optical engine 200 or being detached therefrom. It is noted that the above-mentioned electrical connector 134, in cooperation with the electrical socket 210, can act as a transmission interface of power and signals between the color wheel module 100 and the optical engine 200. Additionally, it can also act as the positioning device therebetween, that is, when the housing module 120 is fastened to the chassis 220 via the fastening device 132, the connection between the electrical connector 134 and the electrical socket 210 is adapted to position the housing module 120 to the chassis 220. Therefore, when the color wheel module 100 is assembled onto the optical engine 200, the relative positions can be aligned quickly and precisely to enhance the assembling and disassembling speed.

Moreover, the positioning device further comprises at least one positioning hole (not shown), disposed on the housing module 120, corresponding to at least one positioning pin 230, disposed on the chassis 220, as illustrated in FIG. 7. When the housing module 120 is fastened onto the chassis 220, the positioning pin 230 is adapted to be plugged into the positioning hole so that the housing module 120 and the chassis 220 can be located quickly and properly. It is noted that the positioning device can also comprise at least one positioning pin, disposed on the housing module, corresponding to at least one positioning hole, disposed on the chassis 220.

According to the description above, the positioning device of the color wheel module of the subject invention comprises several embodiments, for example, the positioning device can use the electrical connector and the electrical socket to achieve the positioning effect. In another aspect, the positioning hole and the positioning pin can be used together to achieve the positioning effect as well. Furthermore, the electrical connector and the electrical socket used together with the positioning hole and the positioning pin can coexist for a better positioning effect.

The fastening device 132 can be used to fasten the color wheel module 100 onto the optical engine 200 after the color wheel module 100 and the optical engine 200 have been positioned by the positioning device. However, when the color wheel module 100 is detached from the optical engine 200, only the fastening device 132 is needed to be released to disable the connection between the color wheel module 100 and the optical engine 200 so that the color wheel module 100 can be quickly detached from the optical engine 200. In real application, the fastening device 132 comprises a plurality of first screws which correspond to a plurality of first screw holes, disposed on the optical engine, for fastening the color wheel module 100 on the optical engine 200.

In summary, the objective of replacing the color wheel module inside a projection apparatus can be achieved via a proper housing module design, and the connecting device which the color wheel module disclosed by the subject invention can be assembled onto the optical engine or detached therefrom. Therefore, users can change the color wheel modules with different specifications for different applications. Similarly, technicians can replace a defective color wheel module with a new unit quickly or disassemble it from a projection apparatus for conducting proper maintenance procedures. Therefore, the life cycle and the efficiency of the projection apparatus can be effectively promoted and extended its application scope.

The above examples are only intended to illustrate the principle and efficacy of the subject invention, not to limit the subject invention. Those skilled in this field may proceed with modifications and changes to the above examples without departing from the technical principle and spirit of the subject invention. Therefore, the scope of protection of the subject invention is covered in the following claims as appended.

What is claimed is:

1. A color wheel module for use in a projection apparatus, the projection apparatus device comprising an optical engine, which comprises a chassis and an electrical socket disposed on the chassis, the color wheel module comprising:
   a color wheel;
   a housing module, comprising a containing space for containing the color wheel,
   a cover defining an opening, the cover and the housing module enclosing the entire color wheel within the containing space, and a connecting device, comprising a fastening device and an electrical connector, and the electrical connector is disposed on the housing module, wherein when the housing module is detachably connected to the chassis, the electrical connector is adapted to electrically connect to the electrical socket which makes the housing module be easily positioned on the chassis, and be fixed onto the chassis through the fastening device.

2. The color wheel module of claim 1, wherein the color wheel and the electrical connector are detachable from each other.

3. The color wheel module of claim 1, wherein the electrical connector is a male connector, whereas the electrical socket is a female connector.

4. The color wheel module of claim 1, wherein the electrical connector is a female connector, whereas the electrical socket is a male connector.

5. The color wheel module of claim 1, further comprising a positioning device, disposed on the color wheel module for positioning the color wheel module onto the optical engine.

6. The color wheel module of claim 5, wherein the positioning device comprises the electrical connector which is corresponding to the electrical socket.

7. The color wheel module of claim 5, wherein the positioning device comprises a positioning pin, disposed on the housing module which is corresponding to a positioning hole formed on the chassis.

8. The color wheel module of claim 5, wherein the positioning device comprises a positioning hole, disposed on the housing module which is corresponding to a positioning pin disposed on the chassis.

9. The color wheel module of claim 1, wherein the fastening device comprises a plurality of first screws which are corresponding to a plurality of first screw holes, disposed on the optical engine.

10. The color wheel module of claim 1, further comprising an index board, disposed on the housing module.

11. The color wheel module of claim 10, wherein the electrical connector electrically connects to the index board so that the electrical connector is adapted to function an interface of power and signal transmission between the color wheel module and the optical engine.

* * * * *